United States Patent
Malkin et al.

(10) Patent No.: US 6,643,684 B1
(45) Date of Patent: Nov. 4, 2003

(54) SENDER- SPECIFIED DELIVERY CUSTOMIZATION

(75) Inventors: Peter Kenneth Malkin, Ardsley, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/168,248

(22) Filed: Oct. 8, 1998

(51) Int. Cl.[7] .............................................. G06F 15/16
(52) U.S. Cl. ....................... 709/206; 709/202; 709/239; 379/905
(58) Field of Search ................................. 709/204, 205, 709/206, 207, 201, 202, 203, 218, 230, 238, 239, 240; 379/905, 90.01

(56) References Cited

U.S. PATENT DOCUMENTS

| | | | | |
|---|---|---|---|---|
| 4,932,026 A | * | 6/1990 | Dev et al. .................... | 370/400 |
| 5,125,075 A | * | 6/1992 | Goodale et al. ............. | 709/206 |
| 5,265,205 A | * | 11/1993 | Schroder ..................... | 709/217 |
| 5,765,033 A | * | 6/1998 | Miloslavsky ................ | 709/200 |
| 5,781,901 A | * | 7/1998 | Kuzma ........................ | 358/402 |
| 5,812,865 A | * | 9/1998 | Theimer et al. .......... | 379/88.13 |
| 5,878,230 A | * | 3/1999 | Weber et al. ............... | 709/238 |
| 5,903,723 A | * | 5/1999 | Beck et al. ................. | 707/10 |
| 5,958,005 A | * | 9/1999 | Thorne et al. .............. | 380/51 |
| 6,023,700 A | * | 2/2000 | Owens et al. ............... | 455/412 |
| 6,108,688 A | * | 8/2000 | Nielsen ....................... | 709/206 |
| 6,185,603 B1 | * | 2/2001 | Henderson et al. ......... | 709/206 |
| 6,192,396 B1 | * | 2/2001 | Kohler ........................ | 709/206 |
| 6,216,104 B1 | * | 4/2001 | Moshfeghi et al. ......... | 704/260 |
| 6,216,165 B1 | * | 4/2001 | Woltz et al. ................ | 709/203 |
| 6,243,398 B1 | * | 6/2001 | Kahane et al. .............. | 370/400 |
| 6,249,808 B1 | * | 6/2001 | Seshadri ..................... | 709/203 |

OTHER PUBLICATIONS

IBM TDB NN9202364 "Method for Object attribute Reply Filtration", 1992, pp. 364–365.*
IBM TDB NN9202381 "OS/2 Office: Delayed Delivery for Mail Items", 1992, pp. 381–382.*
IBM TDB NN9403377 "Method of Automatic Acknowledgement of E–Mail Items Received by New Recipients", 1994, pp. 377–378.*
Armando Fox, et al., "Adapting to Network and Client Variability Via On–Demand Dynamic Distillation"; Proceedings of ASPLOS–VII, p. 1–11; (1996).

(List continued on next page.)

Primary Examiner—Dung C. Dinh
(74) Attorney, Agent, or Firm—Scully, Scott, Murphy & Presser; Gail H. Zarick, Esq.

(57) ABSTRACT

A system and method that enables a given sending user to specify a set of delivery policies and have them used for the electronic delivery of a given message, the message potentially having several heterogeneous parts (e.g., text and pictures) each of which is handled differently, and delivered to multiple heterogeneous devices (e.g., PCs, Smartphones, fax machines), and possibly to several distinct recipients. The factors with which a sender can qualify their delivery policies include: time/date, transmission cost; whether the transmission can be forwarded; receiving device capability; and network reliability, speed, and security transmission. Methods are also provided enabling a sender to specify that particular transmissions be redirected or copied, e.g., "send fax copy to my broker and my accountant." In one embodiment, the delivery policies may be specified using PICS.

58 Claims, 8 Drawing Sheets

OTHER PUBLICATIONS

N. Freed, et al., "Multipurpose Internet Mail Extensions"; (MIME) Part One: Format of Internet Message Bodies, p. 1–22; (1996);

Ora Lassila, et al.; "Resource Description Framework (RDF) Model and Syntax Specification"; W3C (MIT, INRIA, Keio); p. 1–39; (1997, 1998).

Dan Brickley, et al.; "Resource Description Framework (RDF) Schema Specification", W3C (MIT, INRIA, Keio); p. 1–21; (1998).

Tim Krauskopf, et al.; "PICS Label Distribution Label Syntax and Communication Protocols", REC–PICS–labels–961031; p. 1–24; (1996).

Yang–hua Chu, et al.; "DSIG 1.0 Signature Label Specificaiton –Using PICS 1.1 Labels for Making Signed Assertions"; W3C (MIT, INRIA, Keio); p. 1–23 (1998).

Tim Bray, et al.; "Extensible Markup Language (XML)"; World Wide Web Consortium; p. 1–40 (1997).

* cited by examiner

SENDER-SPECIFIED DELIVERY CUSTOMIZATION

CROSS-REFERENCE TO RELATED APPLICATIONS

The present invention is related to U.S. Pat. No. 6,122,666, filed Feb. 23, 1998, entitled "Method for Collaborative Transformation and Caching of Web Objects in a Proxy Network" by P. Yu et al., U.S. Pat. No. 6,275,937, filed Nov. 26, 1997, entitled "Collaborative Server Processing of Content and Meta-Information with Application to Virus Checking in a Server Network" by B. Hailpern et al., U.S. Pat. No. 6,065,058, filed May 9, 1997, "Dynamic Push Filtering with Staging/Buffering in a Proxy Hierarchy", by B. Hailpern, et al.,. These co-pending applications and the present invention are commonly assigned to the International Business Machines Corporation of Armonk, N.Y. The descriptions set forth in these patents are hereby incorporated by reference in their entirety into the present application.

TECHNICAL FIELD

The present invention is related to an improved data transmission system and more particularly to a system for enabling senders to customize protocols for handling and delivering their transmissions. A more particular aspect of the present invention is related to enabling intermediary servers to provide the functionality for the handling and delivery of the sender-customized transmissions.

PRIOR ART

The rapid increase in both the variety and popularity of pervasive systems, including Personal Data Assistants (PDA) (e.g. the product sold by IBM under the trademark of WorkPad) has led to a corresponding increase in the need for the methods of directing and filtering data transmissions. Although many tools have been developed enabling the receivers of transmissions to customize what is delivered to them and how, senders have not been provided the same level of support. For example, proxies such as the web proxies enable both recipients and the administrators to specified content manipulation and routing. "Method for Collaborative Transformation and Caching of Web Objects in a Proxy Network" by P. Yu et al., U.S. Pat. No. 6,122,666 describes a method by which recipients can request intermediary proxy servers to translate requested web pages in specified languages. "Collaborative Server Processing of Content and Meta-Information with Application to Virus Checking in a Server Network" by B. Hailpern et al., U.S. Pat. No. 6,275,937 provides a method by which both end recipients and proxy administrators can have requested web pages checked for viruses. In addition, "Dynamic Push Filtering with Staging/Buffering in a Proxy Hierarchy", by B. Hailpern, et al., U.S. Pat. No. 6,065,058 presents methods by which end users and proxy administrators can filter the pushed information, i.e., information transmitted using the HTTP PUSH method, delivered to end users. Although these methods allow receivers and intermediaries to customize what is to be delivered and to whom, senders still have no capability to specify any delivery customizations.

In addition, while the existing products, such as MCI-One, allow users to set up lists of devices to which transmissions sent to them should be routed and prioritize the lists of such devices, e.g., phone, pager, fax, e-mail, these products do not offer the sender a capability to customize delivery.

In Armando Fox, et. al, "Adapting to Network and Client Variability via On-Demand Dynamic Distillation," In Proceedings of ASPLOS-VII, Boston, Mass. (October 1996), methods for performing on-demand datatype-specific lossy compression on semantically typed data, and tailoring content to the specific constraints of the client are shown. Moreover, Distillation Servers, e.g., InfoPyramid, while enabling receivers and intermediate servers, e.g., proxies, to modify the transmitted data depending on both the characteristics of the target device and communications path to it, such methods still do not allow senders to customize the delivery of transmissions which are originated by the senders.

In addition, products such as "MY Yahoo" allow users to specify the information in which they are interested and would like to receive. With the specified preferences for the information, My Yahoo presents a customized web page to the users when an appropriate connection is established. Users can also be notified—e.g., via e-mail—whenever information in which they are likely to be interested is posted, effectively enabling a given user to customize the information that is sent to them, i.e., enabling a user to customize the transmissions they themselves receive. However, My Yahoo still does not enable a sender to customize the transmission delivered to another user. Therefore, it is highly desirable to provide a method and apparatus enabling a sender to specify handling and delivery policies for transmissions sent to other users, at least one of which being distinct from the sender himself.

SUMMARY OF THE INVENTION

In accordance with the aforementioned needs, the present invention is directed to a method and apparatus enabling both the specification and implementation of sender specified delivery policies. Specifically, in a computer network of heterogeneous nodes including receiving devices having potentially different capabilities, the present invention provides a method for senders to specify content delivery policies by enabling a sender to associate a delivery policy with a transmission content to be communicated to one or more receiving devices. In response to the association, the delivery policy and associated content are then communicated to the one or more receiving devices based on sender-specified policies. In addition, methods are also provided for enabling a transmission—including the handling instructions, or policies—to be passed to another server for processing by sending transmissions with the handling instructions, and providing a proxy server for receiving the transmission, and breaking the transmitted data into its component parts, determining how each component should be handled, and delivering each component to the receiving devices in the specified manner.

The present invention includes methods for identifying the data components of transmissions based on data types. The data types may include, e.g., ASCII text, or GIF image file. The identification of the data components may also be based on XML, which is described in Tim Bray, Jean Paoli, and C. M. Sperberg-McQueen editors, "Extensible Markup Language (XML), World Wide Web Consortium Dec. 8, 1997, and MIME, which is described in N. Borenstrein, et. al., "Multipurpose Internet Mail Extensions (MIME) Part One: Format of Internet Message Bodies," RFC 2045, November, (1996) document structuring.

According to still another aspect of the present invention, the factors with which a sender may qualify their delivery policies include: Time/Date, functional periods of time (e.g., "During work;"); situation (e.g., "when recipient is at a meeting . . ."); Cost (e.g., "Don't send faxes if they will cost more than $1.00 to transmit"); whether transmission may be forwarded (e.g., to home LAN, or to a secretary); capability of the receiving device, including the device type (e.g., pager, fax, PDA), network reliability, network speed, display capabilities (e.g., color, and number of pixels), audio capabilities (e.g., stereo sound), and securable transmission path (e.g., using IPSec).

Methods are also provided enabling a sender to specify particular transmissions to be redirected to another user, or copied to more than one device based on policies. For example, "whenever a FAX is sent to a client's lawyer, fax a copy to the client as well." Similarly, a method is provided by which sender may specify an ordered set of devices in the sender's policies, e.g., "send transmission during work hours to (phone@work, FAX@work, e-mail)" so that given transmissions are routed to the first available device in the list.

The present invention also include methods enabling a sender to indicate that certain components be masked when being transmitted to devices with particular constraints. For example, "don't send highly sensitive information over insecure paths." According to still another aspect of the present invention, a sender's customization policies may be indicated using the Platform for Internet Content Selection (PICS) or the Resource Description Framework (RDF), which policies may be included within the transmission itself, e.g., in the Simple Mail Transfer Protocol (SMTP) or the Hypertext Transfer Protocol (HTTP) headers. A detailed description of the PICS may be found in J. Miller, ed. Et al., "PICS Label Distribution Label Syntax and Communication Protocols." The RDF is described in detail in D. Brickley, ed. et. al, "Resource Description Framework (RDF) Schema Specification," and in O. Lassila, ed. et. al, "Resource Description Framework (RDF) Model and Syntax Specification." A further method enables the policies to be retrieved from a remote server, e.g., by including a policy pointer in an SMTP header indicating a Uniform Resource Locator (URL) of the sender's PICS delivery policy label. As well known to the persons in the skilled art, SMTP is used for Internet mail, and HTTP is the "native" protocol of the World Wide Web, designed specifically to transmit hypertext over networks.

According to still another aspect of the present invention, a method is provided enabling notifications of transmissions to be generated based on policies. For example, "whenever an urgent note is sent to a client, send the client a page notifying them of the transmission." These notifications may be message specific, e.g., "you have received urgent e-mail from Paul Horn."

Methods are also provided in the present invention for allowing policy constraints to include abstract terms, e.g., Devices@Home=Phone@home, FAX@home, e-mail, pager. Similarly, methods are included for supporting the definition and use of qualitative characterization of transmissions, e.g. "business-related," "financial," "family-related," or "personal," in the transmission customization policies.

According to still another aspect of the present invention, methods are included enabling policies to be digitally signed, thus enabling the authentication. The digital signatures may be effected by utilizing the DSIG 1.0 which is described in Yang-hua Chu, et. al, "DSig 1.0 Signature Label Specification, Using PICS 1.1 Labels for Making Signed Assertions." The present invention also provides a method by which a transmission data may be encrypted in a policy-specified manner before being sent to a particular device, e.g., "zip data before sending to modem-connected home computer."

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
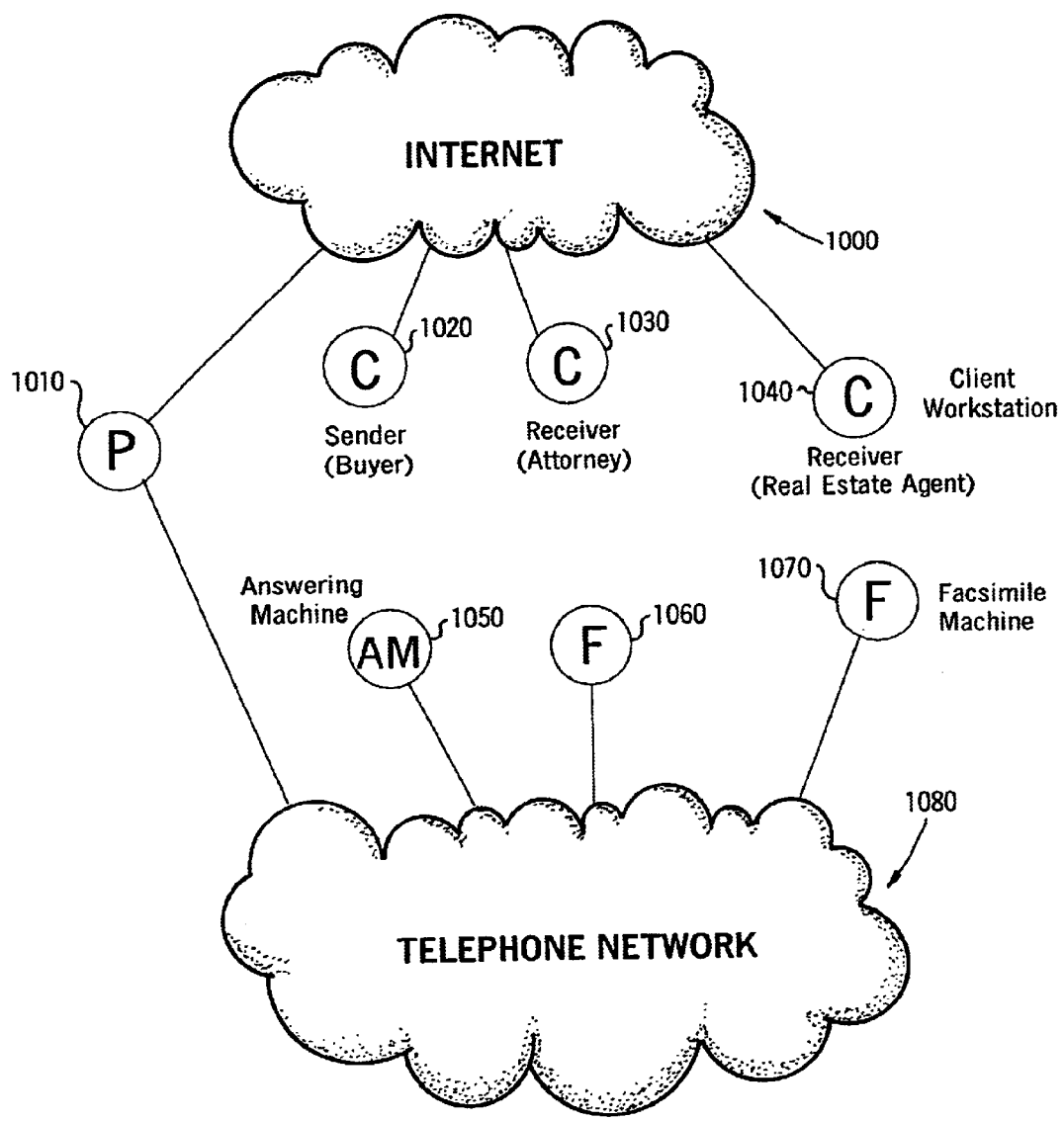
FIG. 1 is a diagram of network environment having features of the present invention.

FIG. 1 illustrates an example of an overall logical architecture of a proxy network having features of the present invention. As shown, the client machines of the sender 1020, the one or more receivers 1030, 1040, and the proxy server 1010 have communications connections to the Internet 1000. The proxy server 1010 is also connected to the telephone network 1080. In addition, other receiving devices such as the sender's telephone answering machine 1050, and the facsimile machines of the receivers 1060, 1070, are also connected to the telephone network 1080. Those with regular skill in the art will appreciate that the current invention may also be applicable to intranets and other types of networks, in addition to the Internet 1000 and telephone networks 1080.

Examples of a client 1020, 1030, 1040 include, but are not limited to, a PDA, PC, workstation, set top box, etc. An example of the proxy server 1010 includes the Internet Connection Server (ICS) sold by IBM. Examples of the network 1000 include, but are not limited to, the Internet, the World Wide Web, an Intranet and local area networks (LANs). Examples of a facsimile machine 1060, 1070 may include, but are not limited to the Brother Model 610. The proxy server 1010 may run on any computing node, including but not limited to, products such as those sold by IBM under the trademarks S/390 SYSPLEX, SP2, or RS6000 workstations.

In a preferred embodiment, a transmission is initiated by the sender 1020 as an HTTP PUT to a proxy server 1010. Those skilled in the art will appreciate that transmissions originating differently may be handled similarly. Other transmission sources include, but are not limited to e-mail and faxes.

A typical use and implementation for the present invention will now be considered with an illustrative example of a home purchase, shown in FIG. 1 as involving a home buyer (sender) who owns a client 1020 and an answering machine 1050, an attorney (receiver) who owns a client

1030 and a facsimile machine 1060, and a real estate agent (receiver) who owns a client 1040 and a facsimile machine 1070. Suppose the home buyer wants to send a note to the real estate agent for the prospective sellers of a house. In this note the buyer wants to indicate that they are only willing to purchase the property if a particular problem with the back wall of the house is fixed by the seller. With their letter, the buyer includes both a photo of the problem area and an e-mail note digitally signed by their building inspector indicating the severity of the problem. The buyer sends this compound note which may include a letter, a photo and an enclosed e-mail note, with the following instructions.

Policy #1: Send a copy of the text portion of the note to my attorney.

Policy #2: Fax the photographs to the both the seller's real estate agent and my attorney to ensure that both get a printed copy.

Policy #3: Notify me when all of the data has been sent, either via phone mail at work if the task completes during business hours, or via e-mail if not.

In a preferred embodiment, these policies are specified using PICS, the Platform for Internet Content Selection protocol, which specifies a method of sending meta-information concerning electronic content. PICS is a Web Consortium Protocol Recommendation and is described in J. Miller, ed. et al., "PICS Label Distribution Label Syntax and Communication Protocols." The PICS protocol may be used to pass the delivery policies by using PICS labels to express senders' delivery requirements. The policies are typically stored by using PICS categories and values.

As known by the skilled artisans, PICS was first used for sending values-based rating labels about a content of a transmission. In PICS, meta-information about electronic content is grouped according to the "rating service" or producer-and-intended-usage of the information, and within such a group, any number of categories or dimensions of information may be transmitted. Each category has a range of permitted values, and for a specific piece of content, a particular category may have a single value or multiple values. Although there is currently only PICS support for HTTP, FTP, Gopher, and ESMTP (a common extended version of SMTP), the technical bodies which define other common application protocols, such as NNTP, are now also considering adding PICS support.

Listed below are the example policies given above, along with their corresponding PICS labels.

| Policy #1: | Send a copy of the text portion of the note to my attorney (i.e., my_attorney@littleFirm.com). |
|---|---|
| PICS Label #1: | |
| 1. (PICS-1.1 | |
| 2. | "http://www.dom.org/senders.policy.rating.service.html") |
| 3. | ratings (if "component_type_is text" copy_to "my_attorney@littleFirm.com") |

Note that the numbers on the left are simply line number indicators, and not part of the actual PICS label. The line breaks and indentation are also only added for clarity. Line 1 indicates that PICS version 1.1 is being used. Line 2 specifies the ratings service that is used to express the policies, and line 3 indicates the policy.

Following the PICS standard, the semantics of the categories ("if and "copy_to") and the interpretation of the category values ("component_type_is text" and "my_ attorney@littleFirm.com") are defined by the specified rating service, http://www.dom.org/senders.policy.rating.service.html". In a preferred embodiment, implications are expressed with PICS labels by using the "if" category. Whenever this category is present, the instructions, expressed by the one or more remaining category/value pairs in the label, are only executed if the value of the "if" category is true. The evaluation of this value and the execution of the instructions are described in detail with reference to the Delivery Handler and FIG. 8. For example, in PICS label #1, the instruction copy_to "my_attorney@littleFirm.com" is only executed if, "component_type_is text" has a value equal to true for a given data component.

| Policy #2: | Fax the photographs to the both the seller's real estate agent and my attorney. |
|---|---|
| PICS Label #2: | |
| 1. (PICS-1.1 | |
| 2. | "http://www.dom.org/senders.policy.rating.service.html") |
| 3. | ratings (definition "'my_attorneys_fax' = '693-4356'") if "component_type_is graphic" fax_to "1 800 999 8888" fax_to "my_attorneys_fax" |

In PICS label #2, lines 1 and 2 are equivalent to those of PICS label #1, and line 3 again expresses the sender's delivery policies. Note the presence of the "definition" category at the beginning of line 3. In a preferred embodiment, whenever any given policy is evaluated, all substitutions specified by definition category/value pairs are made first. A "definition A=B" means "Substitute B for A.". Thus, the policy would be interpreted as: ratings (if "component_type_is graphic" fax_to "1 800 999 8888" fax_to "693-4356'"). This substitution is described in detail with reference to the Policy Reading Handler and FIG. 5. Line 3 instruction indicates that all data components whose type is graphic should be faxed to the specified telephone numbers.

| Policy #3: | Notify me when all of the data has been sent, either via phone mail at work if the task completes during business hours, or via e-mail it not. |
|---|---|
| PICS Label #3: | |
| 1. (PICS-1.1 | |
| 2. | "http://www.dom.org/senders.policy.rating.service.html") |
| 3. | ratings (definition "work_day = 'mon–fri, 9–6'" |
| 4. | definition "buyers_phone = '1 914 555 6666'" |
| 5. | definition "buyers_email = 'buyers@hovel.home.org'" |
| 6. | if "time_period work_day" |
| 7. | voice_mail_notify "buyers_phone 'message sent'" |
| 8. | else " " |
| 9. | notify(buyers_email "'message sent'") |

In PICS label #3, just as with PICS labels #1 and #2, line 1 specifies the version of PICS, line 2 the URL of PICS rating service. In this example, lines 3–9 specify the sender's policy with the line breaks and indentation only added for clarity. Lines 3 through 5 are definitions, i.e., 3. definition "work_day='mon–fri, 9–6'"
  4. definition "buyers_phone='1 914 555 6666'"
  5. definition "buyers_email='buyers@hovel.home.org'"), whose substitutions are made when the policy is evaluated. The substitution methods are described in detail with reference to the Policy Reading Handler and FIG. 5.

The additional factors with which a sender may qualify their delivery policies include: Time/Date, functional periods of time (e.g., "During work;"); situation (e.g., "when recipient is at a meeting"); Cost (e.g., "Don't send faxes if they will cost more than $1.00 to transmit"); whether transmission may be forwarded (e.g., to home LAN, or to a secretary); capability of the receiving device, including the device type (e.g., a PDA, pager, fax), network reliability, network speed, display capabilities (e.g., color, and number of pixels), audio capabilities (e.g., stereo sound), and securable transmission path (e.g., using IPSec).

In PICS label #3, if the value of the "if" category is true, then all category/value pairs up until the "else" category/value pair, i.e., line 7, are executed. Otherwise, all category/value pairs following the "else" category/value pair, i.e., line 9, are executed. Those skilled in the art will appreciate that any number of senders may use a single PICS rating system to express their policies. Therefore, each user need not have their own, and a service provider may provide its customers with a general applicable ratings system, in addition to providing a custom delivery proxy.

Those skilled in the art will also appreciate that the policy PICS labels may include PICS digital signatures as described in PICS specification, enabling the authentication of the sender's delivery instructions. For example, as known by those skilled in the art, the PICS labels may be digitally signed, to ensure the authenticity of the labels, by using the DSig 1.0. Furthermore, as also known by the skilled artisans, the senders' delivery instructions may be similarly specified and communicated by using RDF as an alternate to the PICS labels.

Generally, senders may construct the PICS labels representing their delivery instructions using any common text editor, e.g., the "edit" editor which is included with the Microsoft Windows 95 desktop environment. When the label is constructed, the label may then be added to the header of the sender's HTML document in a meta-tag. Those skilled in the art will appreciate that the PICS label may also be included in the HTTP header when the transmission is sent. For example, a client workstation having a client-side HTTP proxy, a customized web browser or an application which enables a user to specify an HTTP transmission, and one or more PICS labels, may execute HTTP transmission and include the specified PICS labels in the transmission's HTTP request header. More details on HTTP headers and transmissions may be found in the PICS specification. A client workstation may include but are not limited to workstations sold by IBM under the trademark of the Aptiva. An example of a client-side HTTP proxy includes Internet Connection Server (ICS) sold by IBM; and an example of a user specified transmission includes an HTTP PUT of a specified HTML document.

Figure 2:
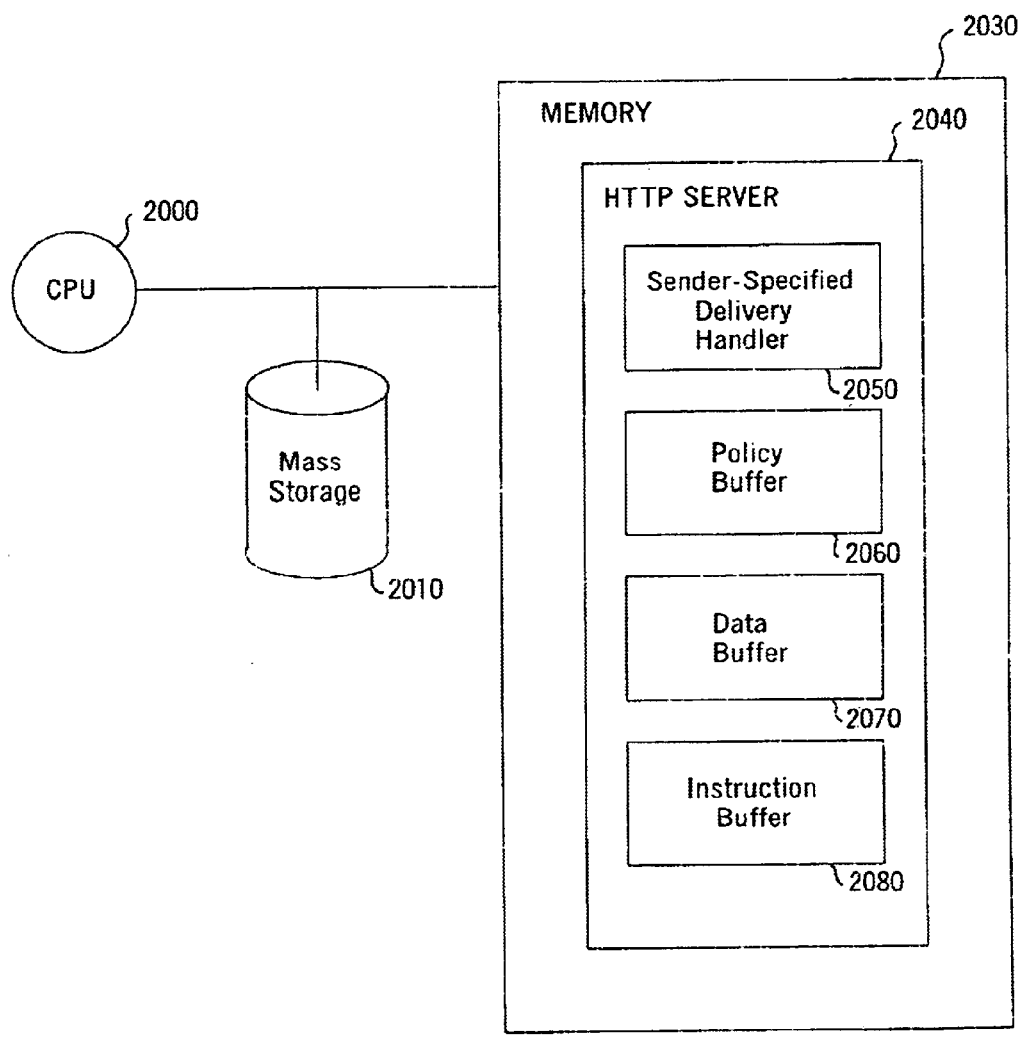
FIG. 2 is a more detailed example of a proxy server having features of the present invention.

FIG. 2 illustrates a more detailed example of the proxy server 1010. The proxy server 1010 preferably includes a CPU 2000, memory 2030 such as RAM, and storage devices 2010 such as a disk or DASD. According to the present invention, the proxy server logic which will be discussed in more detail with reference to FIG. 3, and preferably embodied as computer executable code, is loaded, either remotely over the network or locally, from permanent optical (CD-ROM) or magnetic storage such as disk or DASD 2010 into the memory 2030 for execution by the CPU 2000. The memory 2030 preferably includes an HTTP server 2040, and a server-specified delivery handler 2050 which is discussed in more detail with reference to FIG. 4. The memory 2030 also includes three buffers used solely by the server-specified delivery handler 2050: a policy buffer 2060, a data buffer 2070 and an instruction buffer 2080.

Examples of the HTTP server include, but are not limited to, IBM's Internet Connection Server, ICS. This server provides an API, the Internet Connection Server API, ICSAPI, which enables the development of modules which may be used to customize the behavior of the ICS server.

Specifically, a server may be configured to transfer control to such a module at a particular point during the processing of requests. The module may then perform its task and either return control to the server to complete the transmission, or the module may complete the transmission itself and notify the server when its processing is complete. The server-specified delivery handler 2050 is an example of such a module.

Figure 3:
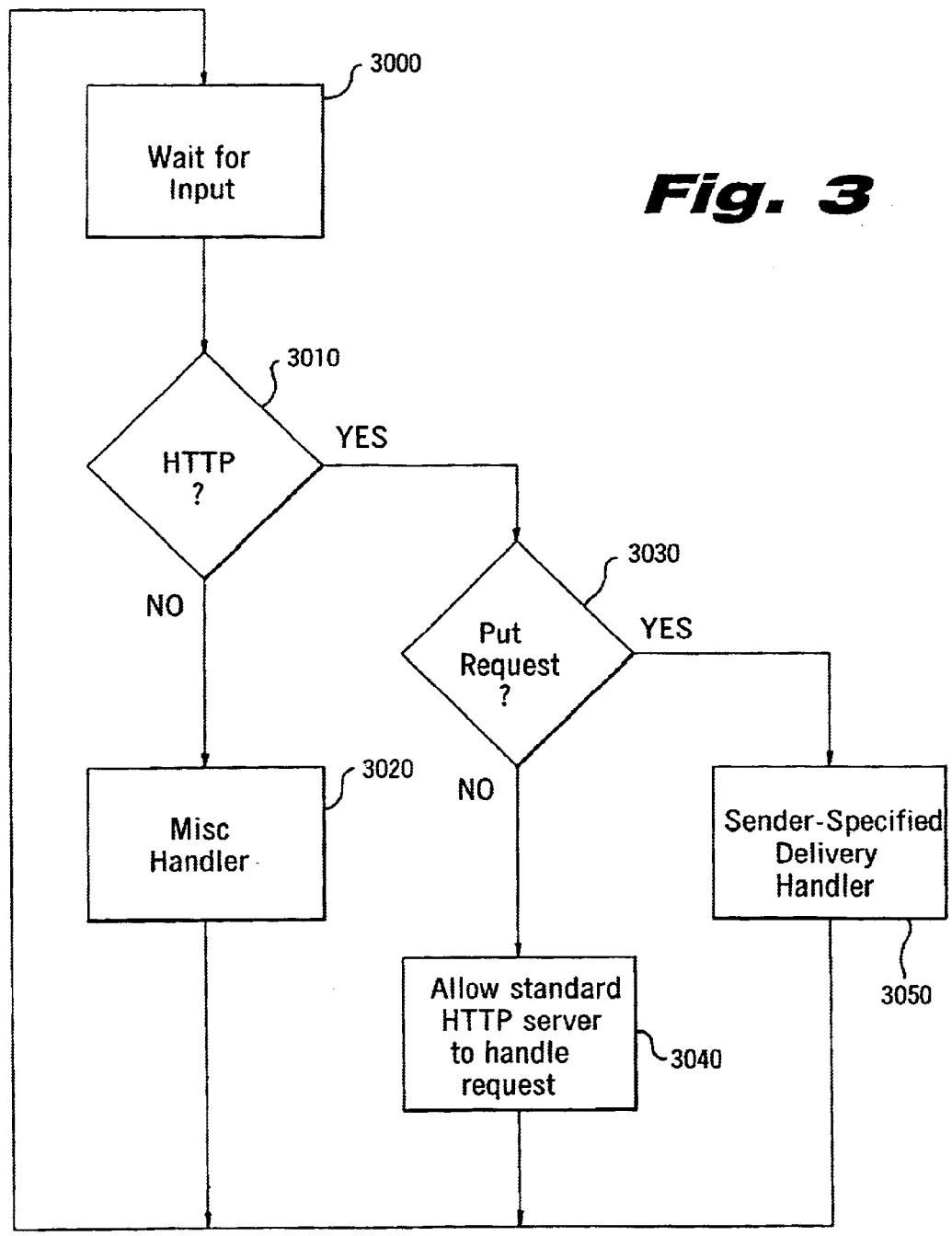
FIG. 3 is an example of the proxy server logic.

FIG. 3 illustrates an example of the proxy server logic. At step 3000, the proxy waits for input. At step 3010 the request type is checked and, if it is not an HTTP request, then, at step 3020, an appropriate handler is invoked. If it is an HTTP request, then at step 3030 its HTTP request type is checked. If the HTTP request type is a PUT request, then, at step 3050, the sender-specified delivery handler 2050 is invoked. If the HTTP request is not a PUT request, the standard HTTP server 2040 is allowed to complete the request at step 3040.

Figure 4:
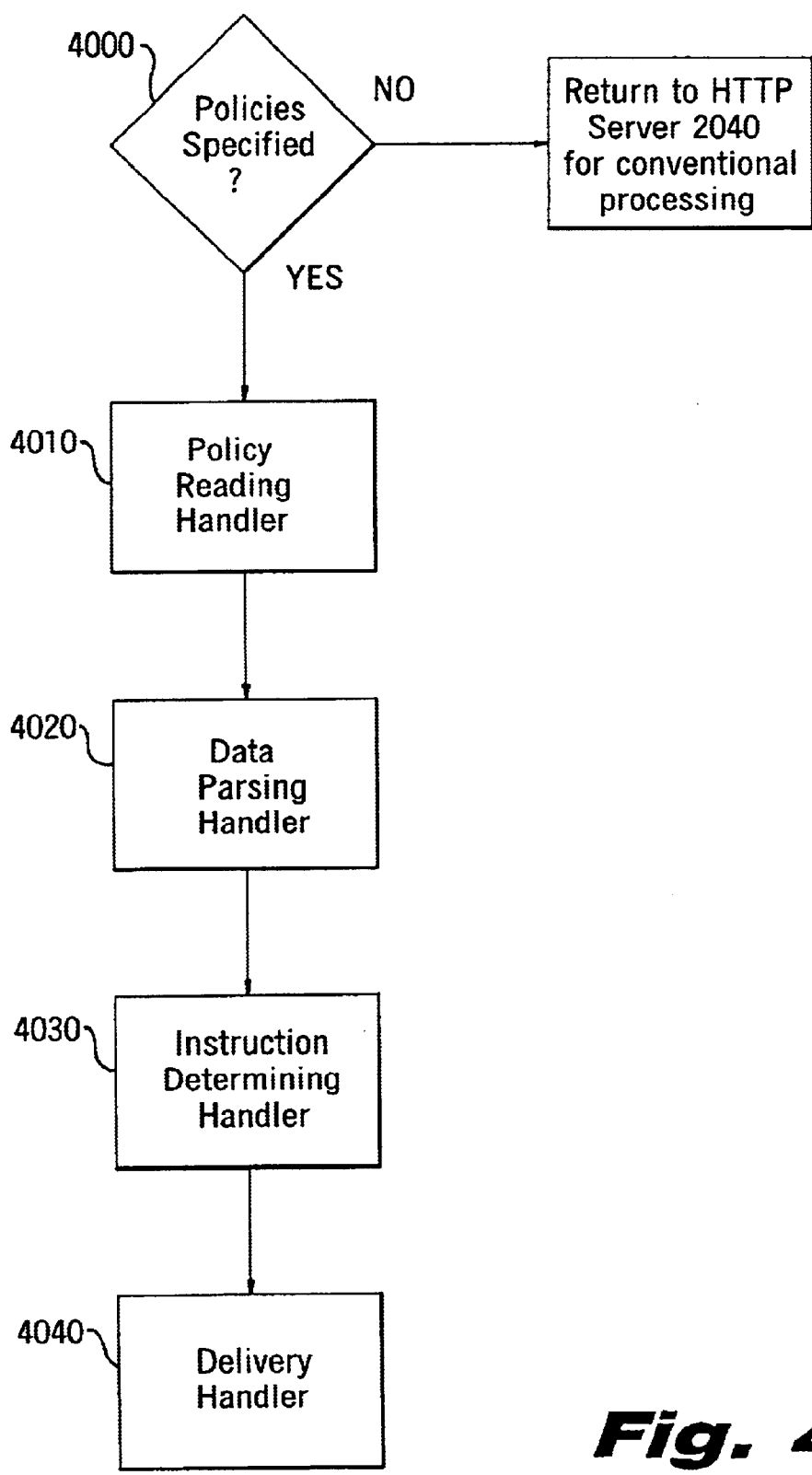
FIG. 4 is an example of the Sender-Specified Delivery Handler.
Figure 5:
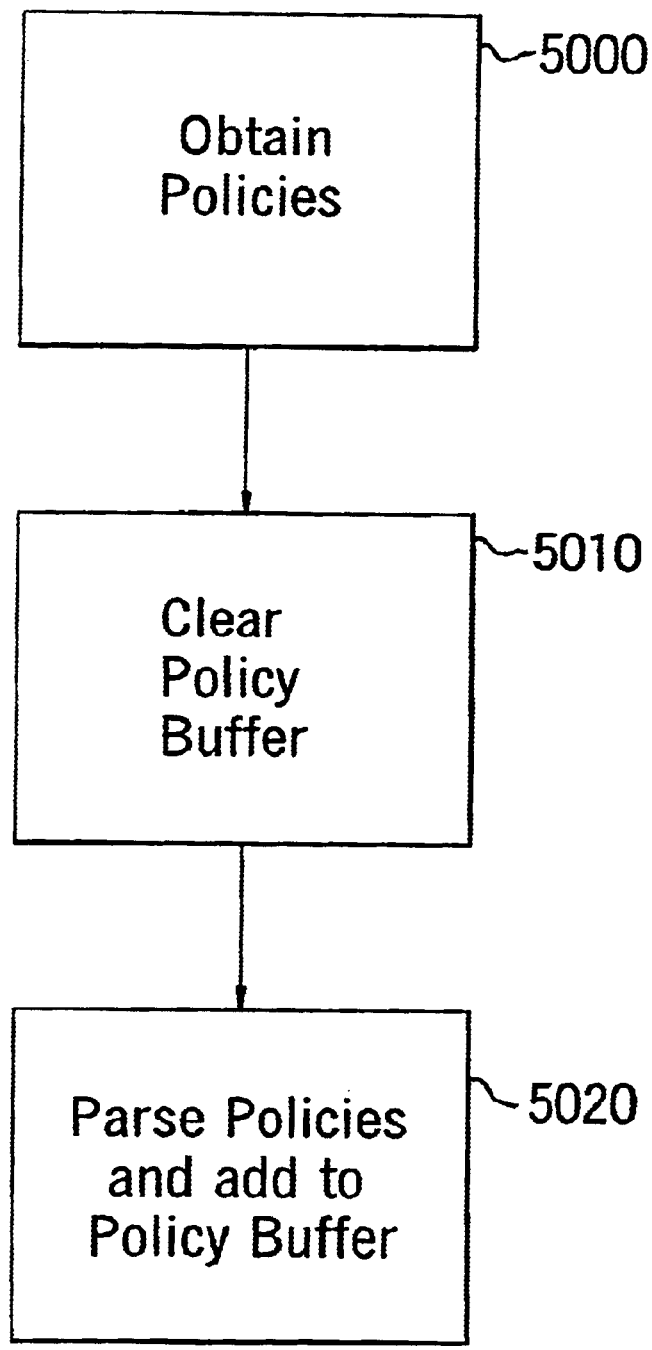
FIG. 5 is an example of the Policy Reading Handler.
Figure 6:
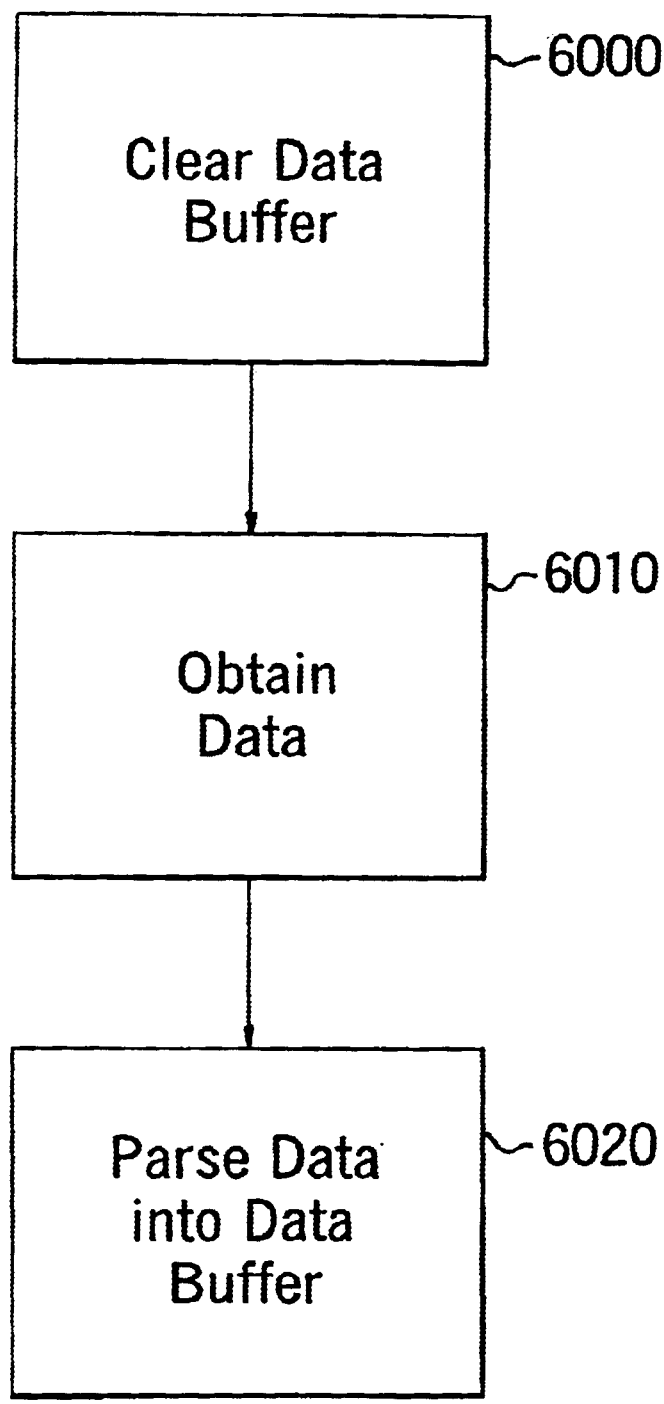
FIG. 6 is an example of the Data Parsing Handler.
Figure 7:
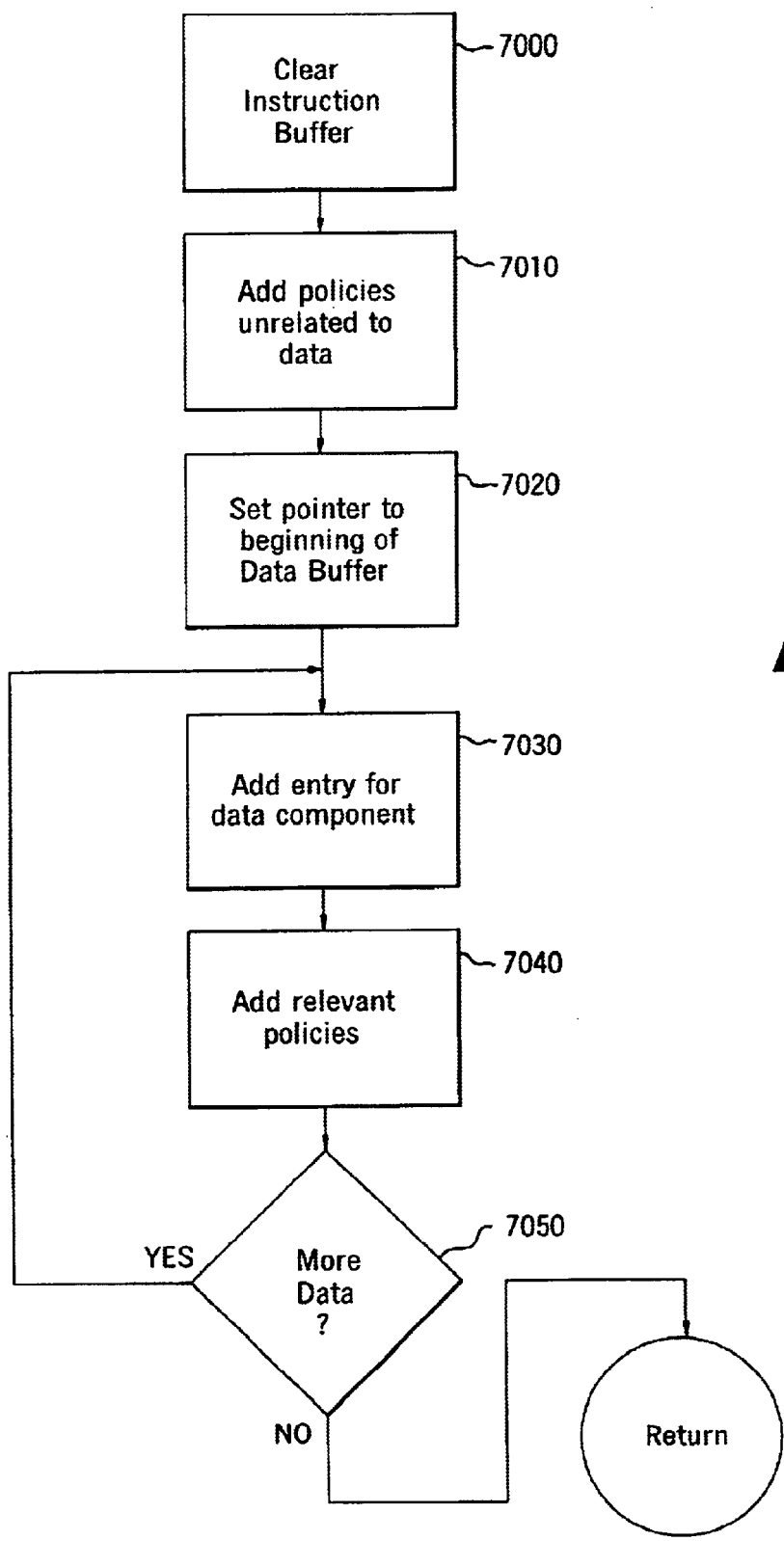
FIG. 7 is an example of the Instruction Determining Handler.
Figure 8:
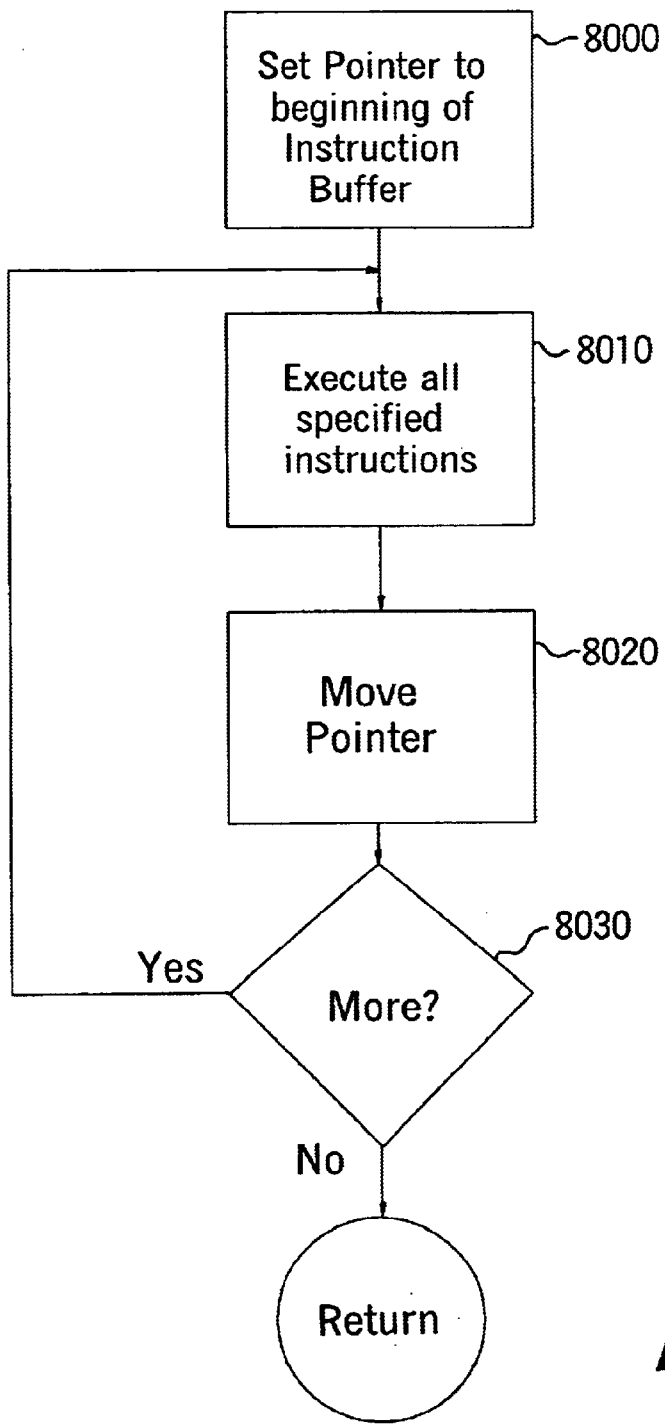
FIG. 8 is an example of the Delivery Handler.

FIG. 4 illustrates an example of the sender-specified delivery handler 2050 process. At step 4000, a request is checked to determine whether any sender-specified policies are included. If not, then control is returned to HTTP server 2040 for conventional processing. If policies are specified, then at step 4010, the policy reading handler, which is described in more detail with reference to FIG. 5, is invoked. Next, at step 4020, the data parsing handler, which is described in more detail with reference to FIG. 6, is invoked. Next, at step 4030, the instruction determining handler, which is described in more detail with reference to FIG. 7, is invoked. At step 4040, the delivery handler which is described in more detail with reference to FIG. 8, is invoked.

FIG. 5 illustrates an example of the policy reading handler 4010. This handler reads the sender-specified policies for the current transmission into the policy buffer 2060. At step 5000, the sender-specified delivery policies are retrieved. Those with regular skill in the are will appreciate that, since the policies are specified using PICS, these policies may be specified in the transmission's HTTP header, HTML header, or referenced via URL from PICS labels included in either the transmission's HTTP or HTML header. At step 5010 the policy buffer 2060 is cleared. At step 5020, the retrieved policies are stored in the policies buffer 2060. Those with regular skill in the art will also appreciate that a local database may be used to store and retrieve the sender's policies, rather than a simple buffer.

The skilled artisans will further appreciate that the current invention also may enable message requesters to specify their delivery customizations. The requester's customization instructions may be specified in exactly the same way as the sender's, i.e., as PICS labels included in the HTTP header. The requester's labels may typically be included in the HTTP header of their request, rather than in the HTTP header of the response, as is the case for the sender's instructions. The policy reading handler 4010, which was described in detail with reference to FIG. 5, then may handle these instructions as described, which then may be stored in the policy buffer 2060. These requester originated instructions may then be combined with the sender's delivery instructions when the data is returned. Those skilled in the art will also appreciate that the policy reading handler 4010 may be extended to provide a conflict resolution scheme for handling the instances where the requester and sender instructions may contradict each other. A simple example of a conflict resolver is one that simply defaults to the sender's instructions whenever a conflict is detected.

FIG. 6 illustrates an example of the data parsing handler 4020. This handler reads and parses the data of the current transmission into the data buffer 2070. At step 6000, the data buffer 2070 (FIG. 2) is cleared. At step 6010, the data components of documents are parsed into the data buffer 2070 with a new data buffer 2070 entry for each data component. The data parsing maintains the integrity of both the information type tags, and the hierarchical structure of the overall HTML document. An example of an information type tags include "<TITLE>". An example of a hierarchical structure of an HTML document may be a component, e.g., a line of text, included as a part of a title of document. In an implementation of a preferred embodiment, the structure of the data buffer 2070 is hierarchical to facilitate the storage and retrieval of the contents of documents. Those with regular skill in the art will also appreciate that a local database may be used to store and retrieve the data elements, rather than a simple buffer. Those skilled in the art will also appreciate that the sender's document, which is structured using XML or MIME, can be parsed similarly.

FIG. 7 illustrates an example of the instruction determining handler 4030 (FIG. 4). This handler uses the instruction buffer 2080 (FIG. 2) to cross-reference the data elements in the data buffer 2070 (FIG. 2) with the policies in the policy buffer 2060 (FIG. 2). Each element of this buffer contains a data element and a list of the policies associated with the data element. At step 7000, the instruction buffer 2080 is cleared. At step 7010, the policy buffer 2060 is scanned, typically from beginning to end, and an entry is added to the instruction buffer 2080 for each policy that does not affect the sending of a data component. An example of such a policy is policy #3, illustrated above, i.e., "Notify me when all of the data has been sent, either via phone mail at work if the task completes during business hours, or via e-mail if not." The data element field of the instruction buffer 2080 entries is left blank. At step 7020, a pointer is moved to the beginning of the data buffer 2070. At the step 7030, a new entry is added to the instruction buffer 2080 and the data component referenced by the pointer is added to the new instruction buffer 2080 entry, the data pointer being moved to the next data buffer 2070 entry. Then, at step 2040, the policy buffer 2060 is scanned, and all policies relevant to the data component are added to the new instruction buffer 2080 entry. At step 7050, if the pointer is at the end of the data buffer 2070, the instruction-determining handler 4040 (FIG. 4) exits. Otherwise, control continues at step 7030.

FIG. 8 illustrates an example of the delivery handler 4040 which executes the sender's delivery instructions. The delivery handler 4040 retrieves each entry of the instruction buffer 2080, e.g., in order, and executes the specified instructions, i.e., policies, on the specified data component if present. It should be noted that some policies may not be related to a specific data component. At step 8000, a pointer is set to the beginning of the instruction buffer 2080. At step 8010, the instructions from the instruction buffer 208 entry referenced by the pointer are executed. The instructions executed need not necessarily involve the transmission of a data component, e.g., sending a notification that a transmission was successful. At step 8020, the pointer is moved to the next instruction buffer 2080 entry. At step 8030, if the pointer is at the end of the instruction buffer 2080, then the delivery handler 4050 exits. Otherwise, control continues at step 8010. Those skilled in the art will appreciate that the delivery handler 4050 can spawn threads, e.g., using the Java programming language to handle the execution of instructions. By using the multi-threaded technology, multiple instructions can be handled simultaneously, and also enable the threads to wait for triggering conditions. An example of a triggering condition is "when all transmissions have been completed."

Those skilled in the art will appreciate that the transformation or translation method of the present invention is not limited to an HTTP proxy. The present invention also applies to other type of proxies, such as a mail proxy which provides a transformation and language translation of e-mail contents.

Now that a preferred embodiment of the present invention has been described, with alternatives, various modifications and improvements will occur to those of skill in the art without departing from the spirit and scope of the invention. For instance, a proxy server and a sending device need not be embodied in separate devices, i.e: the functionality of the proxy server may be included within and performed by a sending device. Thus, the detailed description should be understood as an example and not as a limitation. The proper scope of the invention is properly defined by the appended claims.

Having thus described our invention, what we claim as new, and desire to secure by Letters Patent is:

1. In a computer network of heterogeneous nodes including at least one sending device and one or more receiving devices having potentially different capabilities for receiving transmissions from the at least one sending device, a method for senders to specify content delivery policies and to deliver content accordingly, comprising the steps of:

associating sender specified policies with a particular communication for delivery of content to one or more said receiving devices;

receiving from a sending device the sender-specified policies associated with the particular communication for delivery of content to the one or more said receiving devices, wherein at least one of said receiving devices is distinct from the sending device;

breaking the transmissions into component parts;

determining handling protocols for the component parts; and completing the particular communication for delivery of content to the one or more said receiving devices based on the sender-specified policies associated with said particular communication, wherein the component parts are delivered to one or more said receiving devices according to the handling protocols.

2. The method for senders to specify content delivery policies and to deliver content accordingly as claimed in claim 1, wherein the sending devices include a personal data assistant (PDA).

3. The method for senders to specify content delivery policies and to deliver content accordingly as claimed in claim 1, wherein the method further includes, prior to the step of completing, the step of transmitting the sender-specified policies and the content to one or more processors, said one or more processors forwarding the content to one or more said receiving devices in accordance with the sender-specified policies.

4. The method for senders to specify content delivery policies and to deliver content accordingly as claimed in claim 1, wherein the receiving devices include a personal data assistant (PDA).

5. The method for senders to specify content delivery policies and to deliver content accordingly as claimed in claim 1, wherein the component parts are identified based on data types.

6. The method for senders to specify content delivery policies and to deliver content accordingly as claimed in claim 5, wherein the data types include ASCII text.

7. The method for senders to specify content delivery policies and to deliver content accordingly as claimed in claim 5, wherein the data types include GIF image file.

8. The method for senders to specify content delivery policies and to deliver content accordingly as claimed in claim 1, wherein the component parts are identified based on XML.

9. The method for senders to specify content delivery policies and to deliver content accordingly as claimed in claim 1, wherein the component parts are identified based on MIME.

10. The method for senders to specify content delivery policies and to deliver content accordingly as claimed in claim 1, wherein the content delivery policies are qualified by factors including date and time.

11. The method for senders to specify content delivery policies and to deliver content accordingly as claimed in claim 1, wherein the content delivery policies are qualified by factors including functional periods of time.

12. The method for senders to specify content delivery policies and to deliver content accordingly as claimed in claim 1, wherein the content delivery policies are qualified by factors including cost of transmission.

13. The method for senders to specify content delivery policies and to deliver content accordingly as claimed in claim 1, wherein the content delivery policies are qualified by factors including instructions to forward transmission.

14. The method for senders to specify content delivery policies and to deliver content accordingly as claimed in claim 1, wherein the content delivery policies are qualified by factors including a capability of the receiving devices.

15. The method for senders to specify content delivery policies and to deliver content accordingly as claimed in claim 14, wherein the content delivery policies are qualified by constraints of the capability of the receiving devices, the constraints including device types.

16. The method for senders to specify content delivery policies and to deliver content accordingly as claimed in claim 15, wherein the device types include a facsimile.

17. The method for senders to specify content delivery policies and to deliver content accordingly as claimed in claim 15, wherein the device types include a pager.

18. The method for senders to specify content delivery policies and to deliver content accordingly as claimed in claim 15, wherein the device types include a personal data assistant (PDA).

19. The method for senders to specify content delivery policies and to deliver content accordingly as claimed in claim 14, wherein the capability of the receiving devices includes network reliability.

20. The method for senders to specify content delivery policies and to deliver content accordingly as claimed in claim 14, wherein the capability of the receiving devices includes network speed.

21. The method for senders to specify content delivery policies and to deliver content accordingly as claimed in claim 14, wherein the capability of the receiving devices includes monitor display capabilities.

22. The method for senders to specify content delivery policies and to deliver content accordingly as claimed in claim 21, wherein the monitor display capabilities include screen color resolution.

23. The method for senders to specify content delivery policies and to deliver content accordingly as claimed in claim 21, wherein the monitor display capabilities include screen pixel resolution.

24. The method for senders to specify content delivery policies and to deliver content accordingly as claimed in claim 14, wherein the capability of the receiving devices includes audio capabilities.

25. The method for senders to specify content delivery policies and to deliver content accordingly as claimed in claim 14, wherein the capability of the receiving devices includes securable transmission path.

26. The method for senders to specify content delivery policies and to deliver content accordingly as claimed in claim 1, wherein the content delivery policies include an instruction to redirect the content to another user.

27. The method for senders to specify content delivery policies and to deliver content accordingly as claimed in claim 1, wherein the content delivery policies include an instruction to mask the content.

28. The method for senders to specify content delivery policies and to deliver content accordingly as claimed in claim 1, wherein the content delivery policies are specified using the PICS.

29. The method for senders to specify content delivery policies and to deliver content accordingly as claimed in claim 28, wherein the content delivery policies are retrieved from a remote device.

30. The method for senders to specify content delivery policies and to deliver content accordingly as claimed in claim 1, wherein the content delivery policies are specified using the RDF.

31. The method for senders to specify content delivery policies and to deliver content accordingly as claimed in claim 1, wherein the content delivery policies are included within a transmission.

32. The method for senders to specify content delivery policies and to deliver content accordingly as claimed in claim 31, wherein the transmission includes an SMTP header, and wherein the content delivery policies are included within the SMTP header.

33. The method for senders to specify content delivery policies and to deliver content accordingly as claimed in claim 31, wherein the transmission includes an HTTP header, and wherein the content delivery policies are included within the HTTP header.

34. The method for senders to specify content delivery policies and to deliver content accordingly as claimed in claim 1, wherein the content delivery policies are specified by administrators at a location of one or more said processors.

35. The method for senders to specify content delivery policies and to deliver content accordingly as claimed in claim 1, wherein a sender requests a transmission to be sent to one or more devices based on the content delivery policies.

36. The method for senders to specify content delivery policies and to deliver content accordingly as claimed in claim 1, wherein the method further includes:
   generating notifications of transmissions based on policies.

37. The method for senders to specify content delivery policies and to deliver content accordingly as claimed in claim 36, wherein the step of generating notifications, include sending a page.

38. The method for senders to specify content delivery policies and to deliver content accordingly as claimed in claim 1, wherein the content delivery policies include abstract terms referencing devices in logical groups.

39. The method for senders to specify content delivery policies and to deliver content accordingly as claimed in claim 1, wherein the method further includes:

enabling and including one or more digital signature(s) with the content delivery policies to verify authenticity.

40. The method for senders to specify content delivery policies and to deliver content accordingly as claimed in claim 39, wherein the digital signatures are enabled by using the DSIG 1.0.

41. The method for senders to specify content delivery policies and to deliver content accordingly as claimed in claim 1, wherein the content delivery policies include characterization of transmissions.

42. The method for senders to specify content delivery policies and to deliver content accordingly as claimed in claim 1, wherein the method further includes:

maintaining logs of all transmissions.

43. The method for senders to specify content delivery policies and to deliver content accordingly as claimed in claim 1, wherein the method further includes:

enabling and including one or more digital signature(s) with the content delivery policies to verify authenticity.

44. The method for senders to specify content delivery policies and to deliver content accordingly as claimed in claim 1, wherein the method further includes:

informing the sender whether and where the transmissions were redirected.

45. The method for senders to specify content delivery policies and to deliver content accordingly as claimed in claim 1, wherein the method further includes:

informing the sender of a failure to deliver a transmission.

46. The method for senders to specify content delivery policies and to deliver content accordingly as claimed in claim 1, wherein the method further includes:

retrying transmissions for a predetermined period of time at a predetermined frequency.

47. The method for senders to specify content delivery policies and to deliver content accordingly as claimed in claim 1, wherein the method further includes:

encrypting transmissions data based on the specified content delivery policy, before the step of communicating.

48. The method for senders to specify content delivery policies and to deliver content accordingly as claimed in claim 1, wherein the method further includes enabling a requester to specify delivery preferences.

49. The method for senders to specify content delivery policies and to deliver content accordingly as claimed in claim 48, wherein the method further includes defaulting to the delivery preferences specified by the requester, if the sender does not specify content delivery policies.

50. The method for senders to specify content delivery policies and to deliver content accordingly as claimed in claim 48, wherein the method further includes resolving conflicts between the sender specified delivery policies and the requester specified delivery preferences.

51. The method for senders to specify content delivery policies and to deliver content accordingly as claimed in claim 50, wherein the step of resolving conflicts includes automatically selecting to execute the sender specified delivery policies over the requester specified delivery preferences.

52. The method for senders to specify content delivery policies and to deliver content accordingly as claimed in claim 1, wherein the computer network of heterogeneous nodes includes the Internet.

53. In a computer network of heterogeneous nodes including sending devices and receiving devices having potentially different capabilities, a sender-specified delivery customization system for enabling a sender to specify content delivery policies, comprising:

associating means for enabling a sender to associate one or more delivery policies with content to be communicated to one or more said receiving devices, the content to be sent from at least one of said sending devices;

means for communicating the content to one or more said receiving devices based on the delivery policies, a processor device for receiving a transmission including the content with associated delivery policies, the processor including means for breaking the transmission into component parts, and determining how each component parts should be handled;

wherein the sender is enabled to specify handling protocols for the component parts for delivery to at least one of said receiving devices which is distinct from said at least one of said sending devices, said processor further delivering the component parts to receiving devices according to the handling determination.

54. The sender-specified delivery customization system as claimed in claim 53, wherein the means for communicating further includes:

a policy buffer for storing the delivery policies;

a data buffer for storing the content associated with the delivery policies; and an instruction buffer for storing cross-reference indicator for associating the delivery policies with the content; and a sender-specified delivery handler for analyzing the delivery policies and the associated content;

wherein the sender-specified delivery handler populates the policy buffer, the data buffer, and the instruction buffer according to the analysis.

55. The sender-specified delivery customization system as claimed in claim 54, wherein the sender-specified delivery handler further includes:

a policy reading handler for reading the delivery policies and writing the delivery policies to the policy buffer;

a data parsing handler for reading the content, parsing the content into data components and storing the data components in the data buffer;

an instruction determining handler for cross-referencing the data components in the data buffer with the policies in the policy buffer, the instruction determining handler further determining one or more delivery instructions associated with the data components; and delivery handler for executing said one or more delivery instructions, wherein the content is delivered to one or more said receiving devices according to the delivery policy.

56. The sender-specified delivery customization system as claimed in claim 55, wherein the delivery handler further includes one or more threads running simultaneously, said one or more threads executing said one or more delivery instructions, wherein a plurality of the delivery instructions is executed simultaneously.

57. The sender-specified delivery customization system as claimed in claim 55, wherein the system further includes a database for storing the delivery policy and the content.

58. A computer program product embodied in a computer-readable medium for implementing sender-specified delivery policies in a computer network of heterogeneous nodes including at least one sending device and one or more receiving devices having potentially different capabilities, comprising:

computer readable program code means for causing a computer to associate one or more sender-specified delivery policies with content to be communicated to the one or more receiving devices, computer readable program code means additionally causing the computer to break the transmission into component parts, and determine how each component parts should be handled;

computer readable program code means for causing a computer to communicate the component parts to the one or more receiving devices based on the one or more sender-specified delivery policies and deliver the component parts to receiving devices according to the handling determination, wherein at least one of the receiving devices is distinct from the sending device.

* * * * *